June 22, 1943.  R. B. KINZBACH  2,322,695
PIPE MILLING DEVICE
Filed May 11, 1942  2 Sheets-Sheet 2

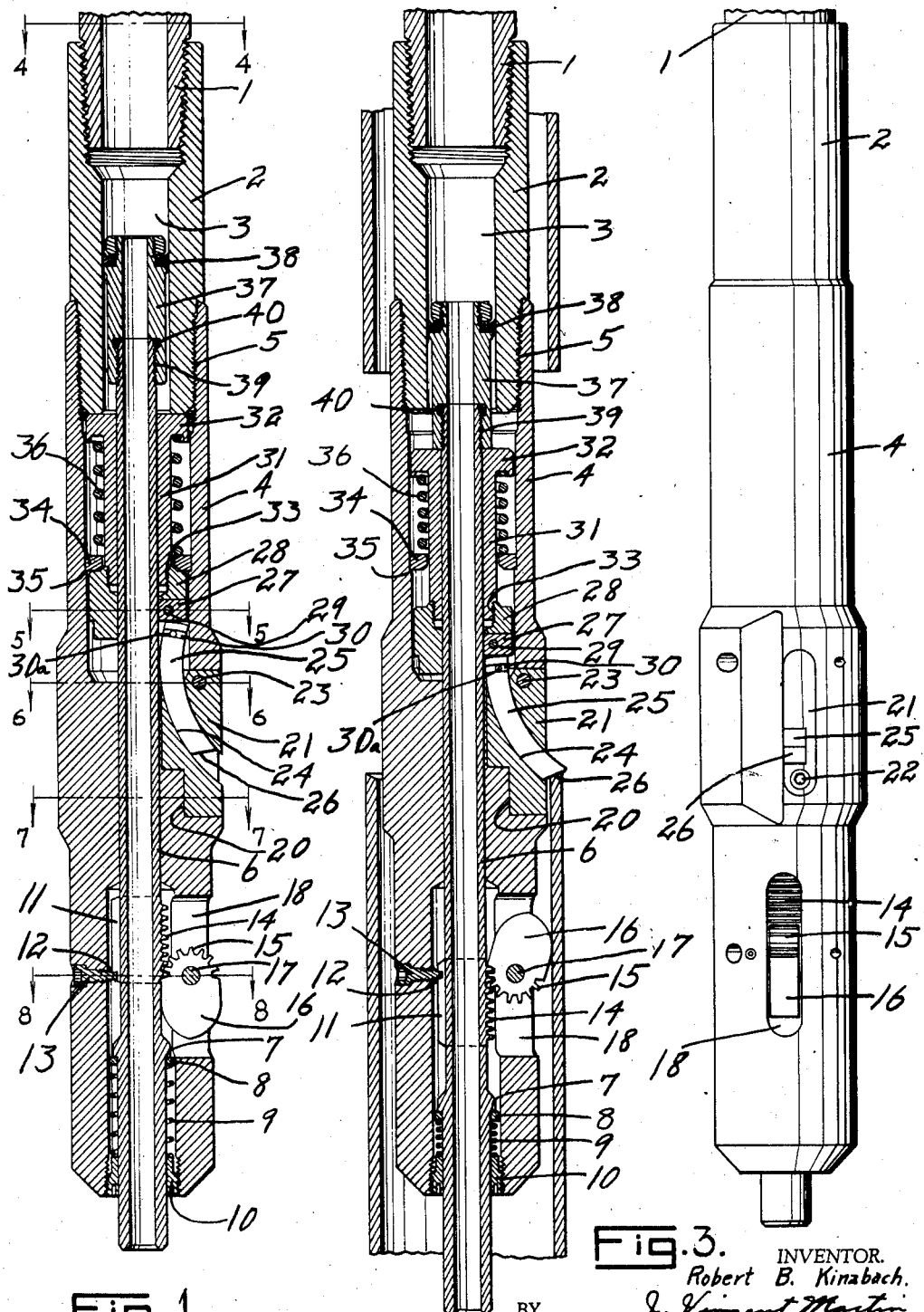

Robert B. Kinzbach.
INVENTOR.
BY
ATTORNEYS

Patented June 22, 1943

2,322,695

UNITED STATES PATENT OFFICE 2,322,695

PIPE MILLING DEVICE

Robert B. Kinzbach, Houston, Tex.

Application May 11, 1942, Serial No. 442,426

15 Claims. (Cl. 164—0.8)

This invention relates to a miller and has for its general object the provision of a milling tool which will be suitable for milling against the end of a pipe or the like to mill away the pipe or a substantial portion of the wall thereof.

The particular application for which the device of this invention is adapted is that of milling away a zone of the casing in a well. It has been proposed heretofore that a portion of a well casing may be removed along some predetermined zone within a well for the purpose of producing fluid from the well through the annular window so formed or for some other purpose which may be desired. To this end tools have been developed for severing and milling out zones of casing. Such a tool is set forth in my prior co-pending patent application Serial No. 414,659, filed October 11, 1941 and entitled Pipe cutter and reamer. It is to be understood that the words mill or miller as used in this description and in the accompanying claims are intended to refer primarily to an operation and to a tool for performing an operation in which the entire pipe is cut or milled away for a portion of its length, although, of course, the term also includes an operation which might sometimes be desirable in which the inner surface only of the pipe is cut or milled away.

During the use of a somewhat complicated tool such as is necessary when the same is to be used as a combined cutter and miller, it frequently becomes necessary to remove the tool for repairs or for a cementing operation or some other reason. After the removal of such tool it is undesirable to again run in the relatively complicated and expensive cutting and milling or tool to perform what is merely a milling operation, and in many instances the condition of the well after the casing has been cut and part of it milled away by the first tool is not such as would make it possible for the first tool to be readily reintroduced and operated again. It is therefore desirable that a simpler tool be provided for merely performing the milling operation.

In view of the foregoing it is an object of this invention to provide a relatively simple positive acting milling tool capable of milling out a zone of a casing in a well.

Another object of this invention is to provide such a tool in which the knives are moved into cutting position only upon contact of an actuating member forming part of the cutter with the upper end of the section of pipe to be cut.

Another object of the invention is to provide a pipe cutter or miller having guides or stabilizers to maintain its alignment within a pipe being cut.

Another object of this invention is to provide such a device in which the milling knife or knives will at all times be held in cutting position by mechanical means as long as the device is in position within an end of a section of casing.

Another object is to provide mechanical means for fully retracting and holding in retracted position the knife or knives of such a tool while it is being withdrawn from a well.

Another object of this invention is to provide such a tool in which the knife or knives will not be moved outwardly toward cutting position unless such movement is voluntarily initiated by the operator.

Another object of this invention is to provide a tool of the character referred to in which the movement of knife actuating members will be initiated by hydraulic action as a result of the operation of pumps in forcing fluid downwardly into the well, but in which when the tool is in cutting position within a pipe or when it is within a pipe with the knives fully retracted fluid pressure will not initiate the movement of the knives.

Other objects and advantages of this invention will become apparent from the following description taken in connection with the accompanying drawings in which one embodiment is set forth by way of illustration.

In the drawings:

Fig. 1 is a longitudinal cross section through a device constructed in accordance with this invention showing the parts in the positions which they occupy while the tool is being lowered into or removed from a well.

Fig. 2 is a similar view but showing the device within a partly milled section of casing which is likewise in longitudinal cross section, and in which the parts of the device are shown in their active position for milling the pipe.

Fig. 3 is a side elevation of the tool shown in Figs. 1 and 2 with the parts in their inactive position as illustrated in Fig. 1.

Figure 4:
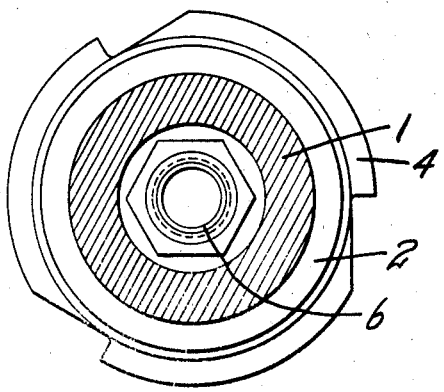
Fig. 4 is a transverse cross section taken along the lines 4—4 of Fig. 1.
Figure 5:
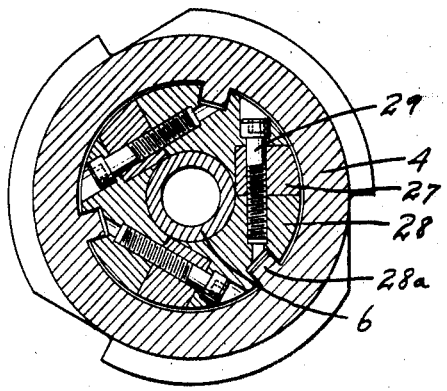
Fig. 5 is a transverse section taken along the line 5—5 of Fig. 1.
Figure 6:
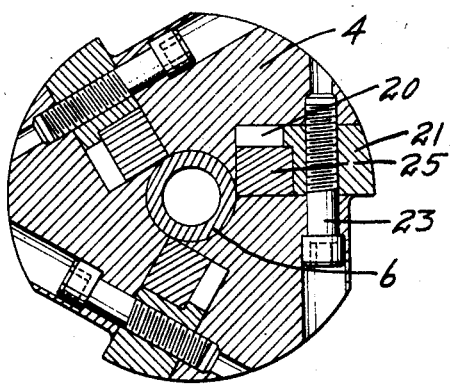
Fig. 6 is a transverse section taken along the line 6—6 of Fig. 1.
Figure 7:
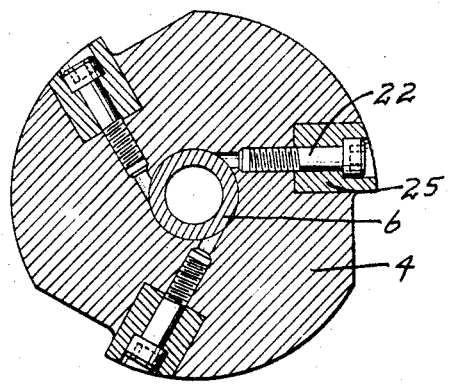
Fig. 7 is a transverse section taken along the line 7—7 of Fig. 1.
Figure 8:
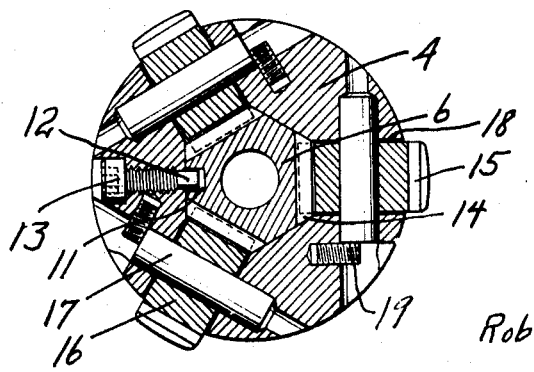
Fig. 8 is a transverse section taken along the line 8—8 of Fig. 1.

Referring more in detail to the drawings the numeral 1 indicates the lowermost section of a string of pipe on which the tool constructed in accordance with this invention is operated. This pipe is threaded at its lower end to receive the upper end of a fitting 2 having a cylindrical interior 3 for the purpose presently to be described. The main body 4 of the tool is threadedly secured at 5 to the lower end of the fitting 2.

Slidably mounted within the body 4 is a member which may be termed a wash pipe 6 and which serves the function not only of a wash pipe but of an actuating member as well. This wash pipe is provided with a downwardly facing shoulder 7 adjacent its lower end against which is placed a washer 8 adapted to receive the upper end of a spring 9. The lower end of this spring bears against a nut 10 holding the spring so that the spring at all times urges the wash pipe toward its uppermost position.

Above the shoulder 7 the wash pipe is provided with an enlargement and this enlargement at one point of the circumference is provided with a slot 11 which may be termed a keyway and which is adapted to receive the inner end 12 of a setscrew 13 mounted in the body 4. Thus, the wash pipe is prevented from rotating about its axis.

This same enlargement on the wash pipe is provided with one or more (three are illustrated in the drawings) flat sides having rack teeth 14 thereon adapted to receive pinion teeth 15 on the control arms 16 which are pivotally mounted at 17 in slots 18 in the body. Thus, as the wash pipe moves up and down these arms 16 will be swung upwardly or downwardly about their axes 17. Each one of the axes 17 is in the form of a pin which is inserted and then held in place within the body by means of a setscrew 19.

Above the portion of the wash pipe just described and above the slots 18 in the body, the body is provided with additional sockets 20 adapted to receive cutter blocks 21 which are inserted into the sockets from the exterior of the body. These cutter blocks 21 are held in place by means of cap screws 22 adjacent their lower ends, which cap screws extend through the lower portions of these blocks and threadedly engage the body 4, and other cap screws 23 which extend transversely through the blocks adjacent their upper ends. The blocks themselves are provided each with a circular guideway 24 extending from its inner upper end and opening outwardly through the blocks adjacent its lower end. These guideways are adapted to receive cutter knives 25 which are of circular arcuate formation having their lower ends 26 provided with cutting edges. The knives are engaged at their upper ends by driving blocks 27 which are in turn mounted and held in place in slots in the driving head 28 by means of cap screws 29. The knives are also transversely slotted at 30 adjacent their upper ends for the purpose of receiving retracting pin portions 30a carried on the opposite sides of the slots in the driving head 28. Thus it will be seen that when the driving head is moved downwardly the blocks 27 will bear against the upper ends of the knives 25 and force the knives downwardly toward the cutting position shown in Fig. 2. When the driving head 28 is moved upwardly the retracting pins 30a will pull the knives upwardly and inwardly to the position shown in Fig. 1.

The driving head 28 is mounted within an enlarged portion of the bore of the body 4 and is carried on the lower end of a sleeve-like member 31 having a head 32 at its upper end. The driving head is prevented from rotation within the body 4 by means of splines 28a in the body 4 which engage within keyways in the driving head. The member 31 is threaded at 33 to the driving head 28.

Surrounding the member 31 is a washer 34 which is disposed within the hollow portion of the body 4 and bears against an internal upwardly facing shoulder 35 in the body. This washer receives on its upper surface the lower end of the spring 36 which has its upper end bearing against the under surface of the head 32. Thus the spring 36 tends at all times to force the member 31 and the driving head 28 upwardly toward the position shown in Fig. 1.

Threadedly mounted on the upper end of the wash pipe 6 is a piston 37 having a packing 38 thereon, this piston adapted to slide upwardly and downwardly within the cylindrical interior of the fitting 2. As will be seen, this piston 37 is threaded to the upper end of the wash pipe at 39 and the joint between them is made leak proof by suitable means such as a sealing ring 40. The piston is larger than the wash pipe and hence when it is moved downwardly it will engage the head 32 and move it downwardly also.

It will be noted further that the passageway through the piston 37 and the wash pipe is much smaller than the passageway through the pipe 1 on which the tool is carried and operated. In operation, the device illustrated in the drawings is lowered into the well with the parts thereof in the position shown in Fig. 1. If during the lowering of the device into the well but while it is still within the casing it is desired to pump downwardly through the tool this may be done without expanding the knives because the downward pressure of the fluid upon the piston 37 cannot move the wash pipe 6 downwardly. This is true because the arms 16 will, as soon as downward movement of the wash pipe begins, come in contact with the inner surface of the casing and prevent any further movement of the wash pipe.

After the device has reached the position of the annular window which has previously been made in the casing as above described and it is desired to expand the knives to milling position, the pump pressure will be applied through the pipe 1 to the piston 37 to move the wash pipe downwardly. This movement will now be permitted because the arms 16 will be located in the opening which has previously been formed in the casing and these arms may swing outwardly and upwardly. The only force opposing the initial downward movement of the wash pipe is that presented by the spring 9. The hydraulic pressure on the piston 37 will ordinarily be employed merely for the purpose of forcing the wash pipe downwardly until this piston engages the head 32. This will start the arms 16 substantially along their outward swing. As soon as the arms 16 swing outwardly to any substantial extent the device may be lowered into the lower portion of the severed casing, which portion is to be milled away. Contact of the arms 16 with the upper end of the pipe to be milled will as the tool is lowered into the pipe rotate these arms to their uppermost position, thus moving the wash pipe to its lowermost position and forcing the knives outwardly to cutting position as shown in Fig. 2. The arms 16 will then engage the inner surface of this casing and be held in their inner and upper positions as illustrated in Fig. 2 so that they now serve to hold the wash pipe down against the tension both of the spring 9 and of the spring 36. In holding the wash pipe down they obviously will mechanically retain the knives 25 in their expanded position.

It is noted also that in as much as the arms 16 are all geared to the wash pipe, they are geared to each other through the wash pipe and will all project outwardly an equal amount at any specified time. They will thus serve to center the cutter body within the pipe being cut.

Thereafter the tool may be rotated to mill away the lower portion of the casing to whatever extent may be desired and during this time fluid may be or may not be pumped through the tool depending upon the desires of the operator. In no event will the flow or lack of flow of fluid through the tool effect the expanded position of the knives.

When the desired amount of milling has been completed the tool will merely be drawn upwardly until the arms 16 move past the upper end of the milled casing, whereupon under the influence of the springs 9 and 36 the wash pipe, the member 31, and the driving head 28 will be moved upwardly to the position shown in Fig. 1 and simultaneously the knives 25 will be drawn upwardly and inwardly to their retracted position.

It will be seen from the foregoing that a tool has been provided which is relatively simple in construction and operation and is substantially fool proof, and which can be efficiently employed for the purpose of milling away a section of pipe in a hole. The device set forth is also capable of carrying out all of the objects and advantages sought by this invention.

Having described my invention, I claim:

1. In a pipe milling tool, a body, a knife mounted on the body for outward radial movement to engage the end of a section of pipe to be milled away, and means adapted to be inserted into the section of pipe to be milled away to engage the same and operatively connected to said knife to move it toward cutting position as said means is inserted into the pipe and to hold the knife in cutting position while said means is in said pipe.

2. In a pipe milling tool, a body, a knife mounted on the body for outward radial movement to engage the end of a section of pipe to be milled away, an actuator in said body movable in one direction to move said knife outwardly to cutting position, hydraulic means for so moving said actuating means, and mechanical means adapted to be expanded by said hydraulic means to engage a section of pipe to be milled away, said mechanical means being operatively connected to said actuator to move the same in a direction to move said knife to cutting position as said mechanical means is moved into a pipe to be milled away.

3. In a pipe milling tool, a body, a knife mounted on the body for outward radial movement to engage the end of a section of pipe to be milled away, a mechanical knife actuator adapted to engage the upper end of a section of pipe to be milled away and to be moved into said section to move the knife to cutting position, and hydraulic means for moving said actuator to an initial position to engage the upper end of said section of pipe to be milled away.

4. In a pipe milling tool, a body, a knife mounted on the body for outward radial movement to engage the end of a section of pipe to be milled away, a wash pipe carried in said body and movable downwardly with respect thereto to expand said knife, a lever connected to said wash pipe and mounted in said body for swinging movement with respect to said body, said lever being adapted to engage with the upper end of a pipe to be milled away to move said wash pipe longitudinally with respect to said body as said body is inserted into the pipe to be milled away, and means on said wash pipe for causing movement of said knife toward cutting position upon such movement of said wash pipe.

5. In a pipe milling tool, a body, a knife mounted on the body for outward radial movement to engage the end of a section of pipe to be milled away, a wash pipe carried by said body and movable longitudinally with respect thereto, said wash pipe having a rack carried thereby, a lever pivotally carried by said body and having pinion teeth engaging said rack and a portion adapted to project from said body and engage the end of a section of pipe to be milled away, whereby when said body is moved into a section of pipe to be milled away said lever may engage said section of pipe and cause longitudinal movement of said wash pipe with respect to said body, and means on said wash pipe adapted to cause outward movement of said knives to cutting position upon longitudinal movement of the wash pipe.

6. In a pipe milling tool, a body, a knife mounted on the body for outward radial movement to engage the end of a section of pipe to be milled away, a wash pipe longitudinally movable with respect to said body, a lever carried by said body and engageable by said wash pipe adapted to swing outwardly and upwardly upon downward movement of said wash pipe, hydraulic means for causing an initial downward movement of said wash pipe, and a lost motion connection between said wash pipe and said knife, whereby said hydraulic means may move said wash pipe downwardly an initial amount to cause partial outward and upward movement of said lever so that said lever will engage the upper end of a pipe to be milled away before downward movement of said wash pipe will cause outward movement of said knife and subsequent downward movement of said body will cause said lever to act against the upper end of the pipe to be milled away to cause complete expansion of said knife as said body enters the pipe to be milled away.

7. In a pipe milling tool, a body, a knife mounted on the body for outward radial movement to engage the end of a section of pipe to be milled away, a wash pipe adapted to be moved downwardly with respect to said body, a sleeve surrounding said wash pipe, a shoulder on said wash pipe adapted to engage the upper end of said sleeve after an initial downward movement of said wash pipe to cause said sleeve thereafter to move downwardly with said wash pipe, and means connecting said sleeve and said knife to produce outward movement of said knife upon downward movement of said sleeve.

8. In a pipe milling tool, a body, a knife mounted on the body for outward radial movement to engage the end of a section of pipe to be milled away, a wash pipe carried by said body and movable longitudinally with respect thereto, lost motion means connecting said wash pipe and said knife whereby downward movement of said wash pipe will cause outward movement of said knife, and independent means for separately urging said wash pipe upwardly and said knife inwardly.

9. In a pipe milling tool, a body, a knife mounted on the body for outward radial movement to engage the end of a section of pipe to be milled away, a wash pipe carried by said body and movable longitudinally with respect thereto, lost motion means connecting said wash pipe and said knife whereby downward movement of said wash pipe will cause outward movement of said knife, and independent springs constantly urging said wash pipe upwardly and said knife inwardly.

10. In a pipe milling tool, a body, a knife mounted on the body for outward radial movement to engage the end of a section of pipe to be milled away, a mechanical knife actuator carried by said body and adapted to engage the upper end of a section of pipe to be milled away and to be moved into said section to move the knife outwardly to cutting position, and means for moving said actuator to an initial position to engage the upper end of said section of pipe to be milled away.

11. In a pipe milling tool, a body, a knife mounted on the body for outward radial movement to engage the end of a section of pipe to be milled away, an elongated member carried by said body and movable longitudinally with respect thereto, lost motion means connecting said elongated member and said knife whereby downward movement of said elongated member will cause outward movement of said knife, and independent means for separately urging said elongated member upwardly and said knife inwardly.

12. An apparatus for milling away the end of a pipe comprising a body insertable in said pipe through the end to be milled away, a knife mounted on the body for outward movement, and means carried by the body and engageable with the end of the pipe to be milled away as the body is inserted therein for moving the knife outwardly into a position to engage the end of the pipe as the body is further inserted into the end of said pipe and for retaining said knife in said outward position.

13. An apparatus for milling away the upper end of a lower severed section of pipe in a well, comprising a body adapted to be lowered through an upper section of pipe and inserted into the lower section through the upper end of the latter, a knife mounted on the body for outward movement, knife actuating means carried by the body below the knife and engageable with the inner surface of the upper section to prevent outward movement of said knife, said means being engageable with the upper end of the lower section of pipe as the body is lowered therein for moving the knife outwardly.

14. An apparatus for milling away the upper end of a lower severed section of pipe in a well, comprising a body adapted to be lowered through an upper section of pipe and inserted into the lower section through the upper end of the latter, a knife mounted on the body for outward movement, and knife actuating means operable while the body is being lowered through the upper section to prevent outward movement of the knife, and operable during movement between the adjacent ends of said upper and lower pipe sections for movement to a position to engage the upper end of the lower section and thereby move the knife outwardly.

15. An apparatus for milling away the upper end of the lower of two vertically axially spaced sections of pipe in a well, comprising a body adapted to be lowered through an upper section of pipe and inserted into the lower section through the upper end of the latter, a knife mounted on the body for outward movement, knife actuating means carried by the body below the knife and engageable with the inner surface of the upper section to prevent outward movement of said knife, and means urging said actuating means outwardly whereby said actuating means will be displaced outwardly beyond the inner surface of the pipe as it is passed downwardly through the space between said sections of pipe and engage the upper end of the lower section upon further downward movement of the body to move the knife outwardly into a position to mill the upper end of the lower section.

ROBERT B. KINZBACH.